(12) United States Patent
Zhang et al.

(10) Patent No.: US 8,712,173 B2
(45) Date of Patent: Apr. 29, 2014

(54) METHODS FOR PROCESSING 2NX2N BLOCK WITH N BEING POSITIVE INTEGER GREATER THAN FOUR UNDER INTRA-PREDICTION MODE AND RELATED PROCESSING CIRCUITS THEREOF

(75) Inventors: Kai Zhang, Beijing (CN); Shaw-Min Lei, Hsinchu County (TW)

(73) Assignee: MediaTek Singapore Pte. Ltd., Singapore (SG)

( * ) Notice: Subject to any disclaimer, the term of this patent is extended or adjusted under 35 U.S.C. 154(b) by 464 days.

(21) Appl. No.: 13/044,489

(22) Filed: Mar. 9, 2011

(65) Prior Publication Data

US 2011/0222790 A1 Sep. 15, 2011

Related U.S. Application Data

(60) Provisional application No. 61/313,174, filed on Mar. 12, 2010.

(51) Int. Cl.
*G06K 9/36* (2006.01)
*G06K 9/46* (2006.01)

(52) U.S. Cl.
USPC .......................................................... 382/238

(58) Field of Classification Search
USPC ......... 382/232, 238, 239, 240, 246, 248, 250; 375/240.02, 240.03, 240.12, 240.18, 375/240.2, 240.24
See application file for complete search history.

(56) References Cited

U.S. PATENT DOCUMENTS

| | | | |
|---|---|---|---|
| 8,160,374 B2 * | 4/2012 | Zheng et al. | 382/239 |
| 8,165,207 B2 * | 4/2012 | Cha et al. | 375/240.12 |
| 8,270,727 B2 * | 9/2012 | Nagori | 382/199 |
| 2006/0146940 A1 | 7/2006 | Gomila | |
| 2008/0175321 A1 * | 7/2008 | Sun et al. | 375/240.15 |

OTHER PUBLICATIONS

International application No. PCT/CN2011/071732, International filing date: Nov. 3, 2011, International Searching Report mailing date: Jun. 16, 2011.

\* cited by examiner

*Primary Examiner* — Phuoc Tran
(74) *Attorney, Agent, or Firm* — Winston Hsu; Scott Margo

(57) ABSTRACT

A method for processing a 2N×2N block under intra-prediction includes: utilizing an intra-prediction unit for performing intra-prediction upon the 2N×2N block by utilizing a plurality of prediction modes, and accordingly generating a plurality of intra-prediction results respectively corresponding to the prediction modes, wherein N is a positive integer greater than four, and a number of the prediction modes is greater than four; and determining a target intra-prediction result from the intra-prediction results.

8 Claims, 5 Drawing Sheets

METHODS FOR PROCESSING 2NX2N BLOCK WITH N BEING POSITIVE INTEGER GREATER THAN FOUR UNDER INTRA-PREDICTION MODE AND RELATED PROCESSING CIRCUITS THEREOF

CROSS REFERENCE TO RELATED APPLICATIONS

This application claims the benefit of U.S. provisional application No. 61/313,174, filed on Mar. 12, 2010 and incorporated herein by reference.

BACKGROUND

The disclosed embodiments of the present invention relate to video coding, and more particularly, to methods for processing 2N×2N block with N being a positive integer greater than four under an intra-prediction mode and related processing circuits thereof.

A prediction block for a current macroblock/block is created from image samples that have already been encoded. This prediction block is subtracted from the current macroblock/block and the result of the subtraction (i.e., the residue data) is compressed and transmitted to the decoder, together with information required for the decoder to repeat the prediction process. The decoder creates an identical prediction block and adds this to the decoded residue data. Regarding an intra-prediction in H.264, the conventional 4×4/8×8 intra-prediction mode has nine prediction modes, including a vertical prediction mode (Mode 0), a horizontal prediction mode (Mode 1), a DC prediction mode (Mode 2), a diagonal_down_left prediction mode (Mode 3), a diagonal_down_right prediction mode (Mode 4), a vertical_right prediction mode (Mode 5), a horizontal_down prediction mode (Mode 6), a vertical_left prediction mode (Mode 7), and a horizontal_up prediction mode (Mode 8).

However, regarding the conventional 16×16 intra-prediction mode in H.264, it has only four prediction modes, including a vertical prediction mode (Mode 0), a horizontal prediction mode (Mode 1), a DC prediction mode (Mode 2), and a plane prediction mode (Mode 3). In addition, regarding the intra-prediction for a 16×16 block, the prediction mode information is coded with the coded block pattern (cbp) information together in the macroblock type (mb_type) syntax element, and no matter whether cbp is 0 or not, a delta quantization parameter (delta QP) must be transmitted. Moreover, a de-blocking filtering operation is performed upon each 4×4 block edge. Thus, when processing certain image contents, the conventional 16×16 intra-prediction mode may not achieve optimized coding efficiency and image quality.

SUMMARY

In accordance with exemplary embodiments of the present invention, methods for processing 2N×2N block with N being a positive integer greater than four under an intra-prediction mode and related processing circuits thereof are proposed to improve the overall coding performance and image quality.

According to a first aspect of the present invention, an exemplary method for processing a 2N×2N block under intra-prediction is disclosed. The exemplary method includes: utilizing an intra-prediction unit for performing intra-prediction upon the 2N×2N block by utilizing a plurality of prediction modes, and accordingly generating a plurality of intra-prediction results respectively corresponding to the prediction modes, wherein N is a positive integer greater than four, and the number of the prediction modes is greater than four; and determining a target intra-prediction result from the intra-prediction results.

According to a second aspect of the present invention, an exemplary method for processing a 2N×2N block under intra-prediction is disclosed. The exemplary method includes: performing intra-prediction upon the 2N×2N block by utilizing a plurality of prediction modes, and accordingly generating a plurality of intra-prediction results respectively corresponding to the prediction modes, wherein N is a positive integer greater than four; determining a target intra-prediction result from the intra-prediction results; and utilizing a coding unit for performing predictively coding upon mode information of a prediction mode corresponding to the target intra-prediction result by referring to a prediction mode derived from at least a neighboring intra-predicted block of the 2N×2N block.

According to a third aspect of the present invention, an exemplary method for processing a 2N×2N block under intra-prediction is disclosed. The exemplary method includes: determining macroblock type information and coded block pattern (cbp) information corresponding to the 2N×2N block, wherein N is a positive integer greater than four; and utilizing a coding unit for generating a codeword with only the macroblock type information and the cbp information coded therein.

According to a fourth aspect of the present invention, an exemplary method for processing a 2N×2N block under intra-prediction is disclosed. The exemplary method includes: utilizing a checking unit for checking if a coded block pattern (cbp) corresponding to the 2N×2N block is equal to zero, wherein N is a positive integer greater than four; and when the cbp is equal to zero, not transmitting information of a delta quantization parameter (delta QP).

According to a fifth aspect of the present invention, an exemplary method for processing a block under intra-prediction is disclosed. The exemplary method includes: checking if the block is a 2N×2N block, wherein N is a positive integer greater than four; and when the block is the 2N×2N block, utilizing a de-blocking filtering unit for performing a de-blocking filtering operation only upon 2N×2N block edges of the 2N×2N block.

According to a sixth aspect of the present invention, an exemplary processing circuit for processing a 2N×2N block under intra-prediction is disclosed. The exemplary processing circuit includes an intra-prediction unit and a determining unit, The intra-prediction unit is for performing intra-prediction upon the 2N×2N block by utilizing a plurality of prediction modes, and accordingly generating a plurality of intra-prediction results respectively corresponding to the prediction modes, wherein N is a positive integer greater than four, and the number of the prediction modes is greater than four. The determining unit is coupled to the intra-prediction unit, and implemented for determining a target intra-prediction result from the intra-prediction results.

According to a seventh aspect of the present invention, an exemplary processing circuit for processing a 2N×2N block under intra-prediction is disclosed. The exemplary processing circuit includes an intra-prediction unit, a determining unit, and a coding unit. The intra-prediction unit is for performing intra-prediction upon the 2N×2N block by utilizing a plurality of prediction modes, and accordingly generating a plurality of intra-prediction results respectively corresponding to the prediction modes, wherein N is a positive integer greater than four. The determining unit is coupled to the intra-prediction unit, and implemented for determining a target intra-prediction result from the intra-prediction results.

The coding unit is coupled to the determining unit, and implemented for performing predictively coding upon mode information of a prediction mode corresponding to the target intra-prediction result by referring to a prediction mode of at least a neighboring intra-predicted block of the 2N×2N block.

According to an eighth aspect of the present invention, an exemplary processing circuit for processing a 2N×2N block under intra-prediction is disclosed. The exemplary processing circuit includes a macroblock type determining unit, a coded block pattern (cbp) determining unit, and a coding unit. The macroblock type determining unit is for determining macroblock type information corresponding to the 2N×2N block, wherein N is a positive integer greater than four. The cbp determining unit is for determining cbp information corresponding to the 2N×2N block. The coding unit is coupled to the macroblock type determining unit and the cbp determining unit, and implemented for generating a codeword with only the macroblock type information and the cbp information coded therein.

According to a ninth aspect of the present invention, an exemplary processing circuit for processing a 2N×2N block under intra-prediction is disclosed. The exemplary processing circuit includes a checking unit and a control unit. The checking unit is for checking if a coded block pattern (cbp) corresponding to the 2N×2N block is equal to zero, wherein N is a positive integer greater than four. The control unit is coupled to the checking unit. The control unit does not transmit information of a delta quantization parameter (delta QP) when the cbp is equal to zero.

According to a tenth aspect of the present invention, an exemplary processing circuit for processing a block under intra-prediction is disclosed. The exemplary processing circuit includes a checking unit and a de-blocking filtering unit. The checking unit is for checking if the block is a 2N×2N block, wherein N is a positive integer greater than four. The de-blocking filtering unit is coupled to the checking unit. When the block is the 2N×2N block, the de-blocking filtering unit performs a de-blocking filtering operation only upon 2N×2N block edges of the 2N×2N block.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Please note that the prediction modes mentioned hereinafter are for illustrative purposes only, and are not meant to be limitations of the present invention. For example, the intra-prediction angles of the intra-prediction modes supported by the present invention are not limited to those mentioned in the following paragraphs.

Figure 1:
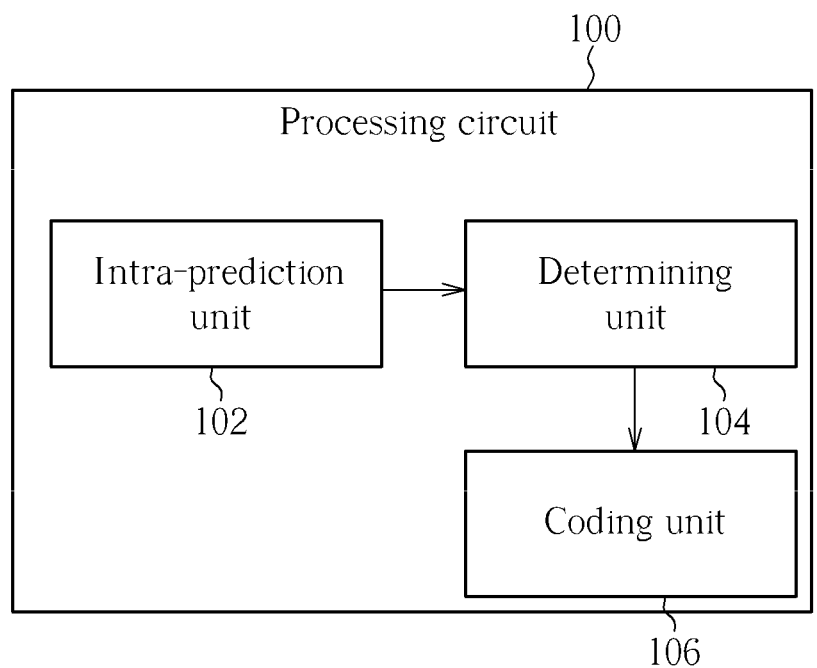
FIG. 1 is a block diagram illustrating a processing circuit for processing a 2N×2N block under intra-prediction according to a first exemplary embodiment of the present invention.

Please refer to FIG. 1, which is a block diagram illustrating a processing circuit for processing a 2N×2N block under intra-prediction according to a first exemplary embodiment of the present invention. The exemplary processing circuit 100 may be implemented in either of an encoder and a decoder, and includes, but is not limited to, an intra-prediction unit 102, a determining unit 104, and a coding unit 106. The intra-prediction unit 102 is used for performing an intra-prediction upon the 2N×2N block by utilizing a plurality of prediction modes and accordingly generating a plurality of intra-prediction results respectively corresponding to the prediction modes. Please note that N is a positive integer greater than four. For example, N is equal to 8. Thus, in contrast to the conventional 16×16 intra-prediction mode which only uses four prediction modes, the modified 16×16 intra-prediction mode proposed in one exemplary embodiment of the present invention has more than four prediction modes. The exemplary prediction modes employed by the intra-prediction unit 102 may include eight prediction modes as originally used by the conventional 4×4/8×8 intra-prediction mode and one prediction mode as originally used by the conventional 16×16 intra-prediction mode. By way of example, but not limitation, the prediction modes employed by the intra-prediction unit 102 may include a vertical prediction mode (i.e., Mode 0 in conventional 4×4/8×8 intra-prediction mode), a horizontal prediction mode (i.e., Mode 1 in conventional 4×4/8×8 intra-prediction mode), a DC prediction mode (i.e., Mode 2 in conventional 4×4/8×8 intra-prediction mode), a diagonal_down_left prediction mode (i.e., Mode 3 in conventional 4×4/8×8 intra-prediction mode), a plane prediction mode (i.e., Mode 3 in conventional 16×16 intra-prediction mode), a vertical_right prediction mode (i.e., Mode 5 in conventional 4×4/8×8 intra-prediction mode), a horizontal_down prediction mode (i.e., Mode 6 in conventional 4×4/8×8 intra-prediction mode), a vertical_left prediction mode (i.e., Mode 7 in conventional 4×4/8×8 intra-prediction mode), and a horizontal_up prediction mode (i.e., Mode 8 in conventional 4×4/8×8 intra-prediction mode). As the probability of using the diagonal down-right prediction mode (i.e., Mode 4 of the conventional 4×4/8×8 intra-prediction mode) to find a desired prediction block is low, meaning that the prediction block is unlikely predicted using the prediction direction defined by the diagonal down-right prediction mode, the present invention therefore replaces the diagonal down-right prediction mode with the plane prediction mode originally used in the conventional 16×16 intra-prediction mode for achieving better coding performance.

However, the above example is for illustrative purposes only, and is not meant to be a limitation to the present invention. That is, regarding the modified 16×16 intra-prediction mode, the spirit of the present invention is obeyed as long as the number of employed prediction modes is greater than four.

The processing circuit 100 further has the determining unit 104, coupled to the intra-prediction unit 102, for determining a target intra-prediction result (i.e., a target prediction block) from the intra-prediction results derived from the intra-prediction unit 102. In a case where the intra-prediction unit 102 performs intra-prediction upon the 16×16 block by utilizing nine prediction modes as mentioned above, nine intra-prediction results derived from the nine prediction modes are obtained accordingly. Next, the determining unit 104 selects a specific intra-prediction result from the intra-prediction results to be the target intra-prediction result when the difference between the specific intra-prediction result and the 16×16 block to be encoded has a minimum value, and sets a prediction mode of the 16×16 block by the prediction mode of the target intra-prediction result.

As mentioned above, regarding the conventional 16×16 intra-prediction mode, the prediction mode information would be coded with the coded block pattern (cbp) information together in the macroblock type (mb_type) syntax element. In the modified 16×16 intra-prediction mode proposed in an exemplary embodiment of the present invention, a predictive coding scheme is employed. As shown in FIG. 1, the processing circuit 100 also includes a coding unit 106, coupled to the determining unit 104, for performing predictively coding upon mode information of a prediction mode corresponding to the target intra-prediction result (i.e., the target prediction block). An example of predictive coding comprises referring to one or more prediction modes of at least one neighboring intra-predicted block of the 2N×2N block (e.g., 16×16 block). The choice of a prediction mode for the 2N×2N block to be encoded must be transmitted and this could potentially require a large number of bits. However, prediction modes of neighboring blocks are highly correlated. Thus, the predictive coding scheme is employed to reduce the number of bits transmitted. In this exemplary embodiment, prediction modes of two previously-encoded intra-predicted blocks adjacent to the 16×16 block are used for encoding the prediction mode of the 16×16 block, where the previously-encoded intra-predicted block may be a 4×4 intra-predicted block, a 8×8 intra-predicted block, or a 16×16 intra-predicted block. Therefore, a prediction mode corresponding to the target intra-prediction result may be utilized by the determining unit 104 for predicting a prediction mode of at least one neighboring intra-predicted block of the 2N×2N block (e.g., 16×16 block). Please note that, no matter whether an intra-prediction unit uses more than four prediction modes in the 16×16 intra-prediction mode, the spirit of the present invention is also obeyed when mode information of a prediction mode corresponding to the target intra-prediction result of the 16×16 block is predictively coded. The coding unit 106 may employ any available predictive coding scheme for coding the prediction mode information. As a person skilled in the art can readily understand details of the predictive coding scheme employed by the coding unit 106, further description is omitted here for brevity.

Figure 2:
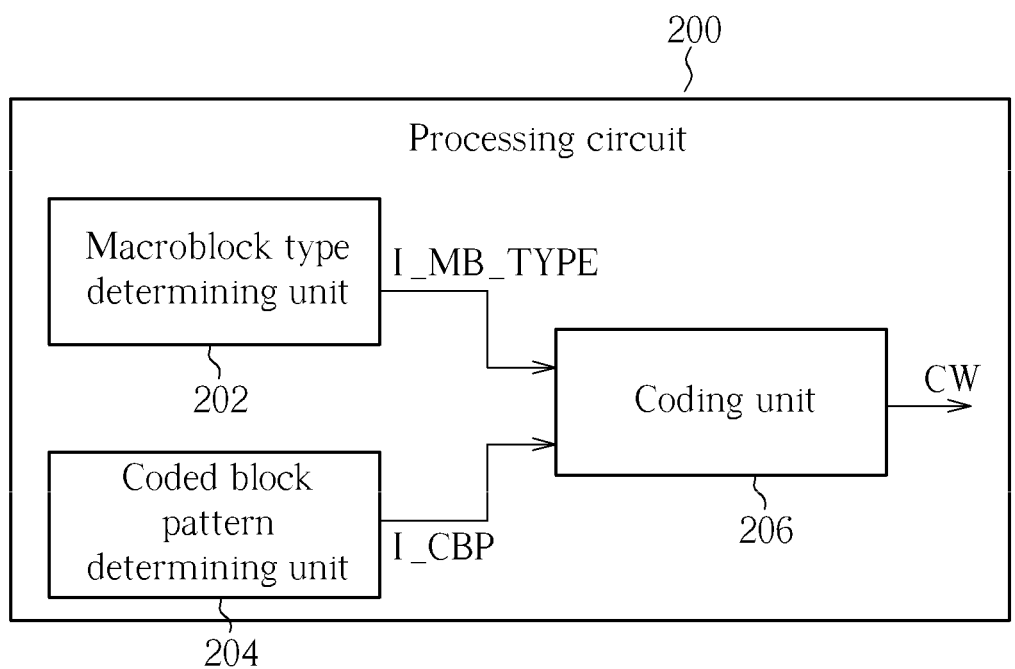
FIG. 2 is a block diagram illustrating a processing circuit for processing a 2N×2N block under intra-prediction according to a second exemplary embodiment of the present invention.

Please refer to FIG. 2, which is a block diagram illustrating a processing circuit for processing a 2N×2N block under intra-prediction according to a second exemplary embodiment of the present invention. The exemplary processing circuit 200 may be implemented in either of an encoder and a decoder, and includes, but is not limited to, a macroblock type determining unit 202, a coded block pattern (cbp) determining unit 204, and a coding unit 206. The macroblock type determining unit 202 is used for determining macroblock type information I_MB_TYPE corresponding to the 2N×2N block, wherein N is a positive integer greater than four. The coded block pattern (cbp) determining unit 204 is used for determining cbp information I_CBP corresponding to the 2N×2N block. For example, N is equal to 8, and the 2N×2N block is a 16×16 block.

As mentioned above, regarding the conventional 16×16 intra-prediction mode, the prediction mode information is coded with the coded block pattern (cbp) information together in the macroblock type (mb_type) syntax element. In the modified 16×16 intra-prediction mode proposed by an exemplary embodiment of the present invention, only the cbp information is coded in the mb_type syntax element, and the prediction mode information will not be coded in the mb_type syntax element. As shown in FIG. 2, the processing circuit 200 further has the coding unit 206, coupled to the macroblock type determining unit 202 and the cbp determining unit 204, for generating a codeword CW with only the macroblock type information I_MB_TYPE and the cbp information I_CBP coded therein. By way of example, but not limitation, the coding unit 206 generates the codeword CW by performing variable length coding (VLC) upon the macroblock type information I_MB_TYPE and the cbp information I_CBP.

Figure 3:
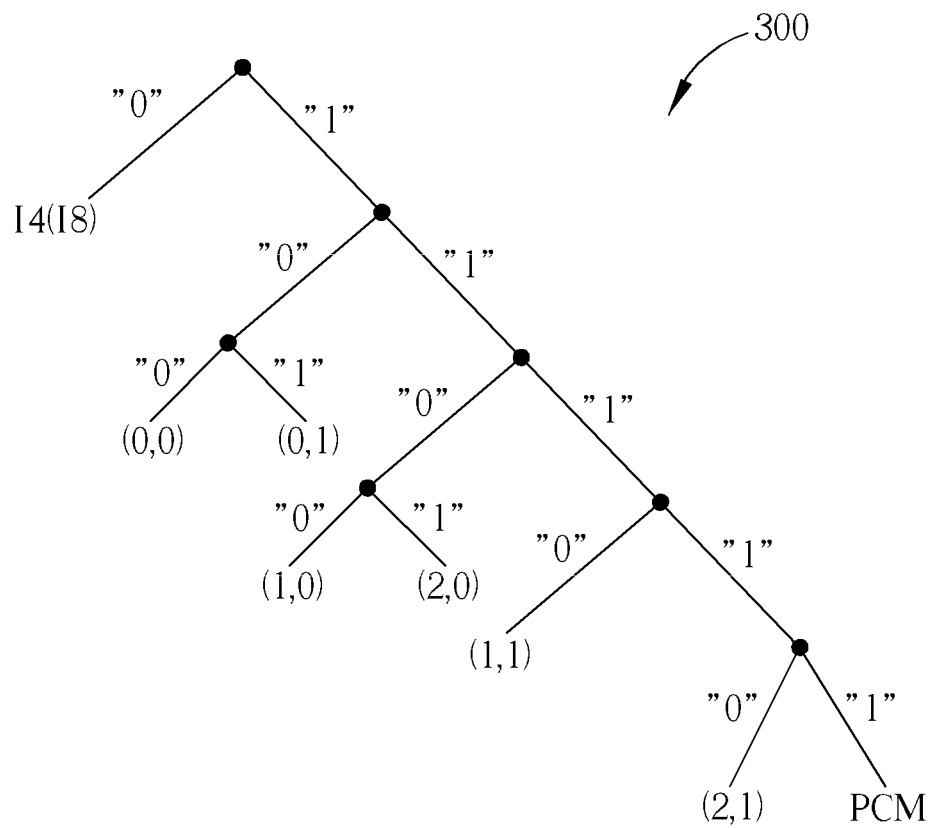
FIG. 3 is a diagram illustrating an exemplary code tree associated with a codeword generated from a coding unit shown in FIG. 2.

Please refer to FIG. 3, which is a diagram illustrating an exemplary code tree 300 associated with the codeword CW generated from the coding unit 206 shown in FIG. 2. As shown in the figure, when a block is a 4×4/8×8 intra-prediction block, the codeword CW is assigned with "0"; when a block is a 16×16 intra-prediction block, the chroma cbp is equal to 0, and the luma cbp is equal to 0, the codeword CW is assigned with "100"; when a block is a 16×16 intra-prediction block, the chroma cbp is equal to 0, and the luma cbp is equal to 1, the codeword CW is assigned with "101"; when a block is a 16×16 intra-prediction block, the chroma cbp is equal to 1, and the luma cbp is equal to 0, the codeword CW is assigned with "1100"; when a block is a 16×16 intra-prediction block, the chroma cbp is equal to 2, and the luma cbp is equal to 0, the codeword CW is assigned with "1101"; when a block is a 16×16 intra-prediction block, the chroma cbp is equal to 1, and the luma cbp is equal to 1, the codeword CW is assigned with "1110"; when a block is a 16×16 intra-prediction block, the chroma cbp is equal to 2, and the luma cbp is equal to 1, the codeword CW is assigned with "11110"; and when a lossless PCM representation mode is employed, the codeword CW is assigned with "11111". It should be noted that the codeword length of the assigned codeword may be inversely proportional to the occurrence probability of the combination of the macroblock type information I_MB_TYPE and the cbp information I_CBP to improve the coding efficiency.

Figure 4:
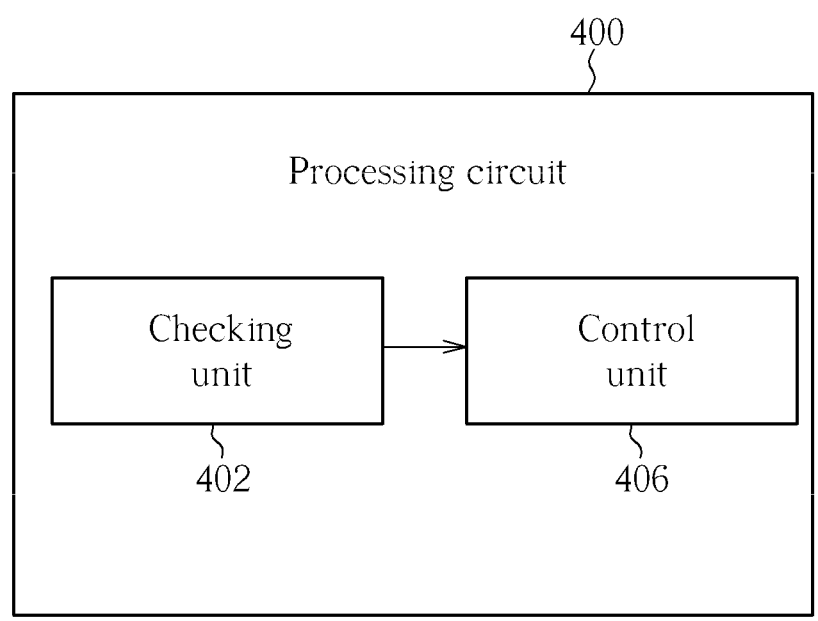
FIG. 4 is a block diagram illustrating a processing circuit for processing a 2N×2N block under intra-prediction according to a third exemplary embodiment of the present invention.

Please refer to FIG. 4, which is a block diagram illustrating a processing circuit for processing a 2N×2N block under intra-prediction according to a third exemplary embodiment of the present invention. The exemplary processing circuit 400 may be implemented in either of an encoder and a decoder, and includes, but is not limited to, a checking unit 402 and a control unit 406. The checking unit 402 is used for checking if a coded block pattern (cbp) corresponding to the 2N×2N block is equal to zero, wherein N is a positive integer greater than four. For example, N is equal to 8, and the 2N×2N block is a 16×16 block. As mentioned above, no matter whether cbp is 0 or not, the delta quantization parameter (delta QP) must be transmitted according to the conventional 16×16 intra-prediction design. However, when the cbp is equal to zero, it means that all DCT coefficients of the residue between a prediction block and the 2N×2N block (e.g., 16×16 block) are 0's. Thus, as there is no need to adjust the quantization step, the information of the delta QP should not be transmitted for adjusting the QP. To solve this problem, the processing circuit 400 further has the control unit 406 coupled to the checking unit 402, wherein the control unit 406 does not transmit information of delta QP when the cbp is found equal to zero (i.e., the luma cbp and the chroma cbp are both equal to 0).

Figure 5:
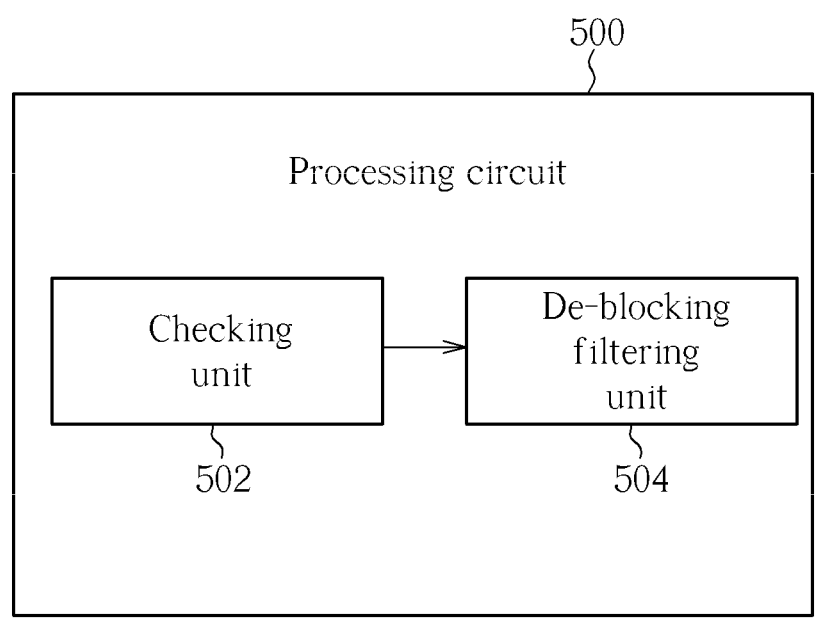
FIG. 5 is a block diagram illustrating a processing circuit for processing a 2N×2N block under intra-prediction according to a fourth exemplary embodiment of the present invention.

Please refer to FIG. 5, which is a block diagram illustrating a processing circuit for processing a 2N×2N block under intra-prediction according to a fourth exemplary embodiment of the present invention. The exemplary processing circuit 500 may be implemented in either of an encoder and a decoder, and includes, but is not limited to, a checking unit 502 and a de-blocking filtering unit 504. As mentioned above, the de-blocking filtering operation is performed upon each 4×4 block edge according to the conventional 16×16 intra-prediction design. To solve this problem for achieving better image quality, the checking unit 502 is used for checking if a block to be processed is a 2N×2N block, wherein N is a positive integer greater than four. For example, N is equal to 8, and the checking unit 502 therefore checks if the block to be processed is a 16×16 block. Regarding the de-blocking filtering unit 504 coupled to the checking unit 504, it performs a de-blocking filtering operation only upon 2N×2N block edges of the 2N×2N block when the checking unit 502 detects that the block is a 2N×2N block. For example, when the checking unit 502 finds that the block to be processed is a 16×16 block, the de-blocking filtering unit 504 performs a de-blocking filtering operation only upon 16×16 block edges of the 16×16 block.

Briefly summarized, the coding efficiency and/or image quality may be improved by using at least one of the aforementioned modifications made to the conventional 16×16 intra-prediction design.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for processing a 2N×2N block under intra-prediction, comprising:
   determining macroblock type information and coded block pattern (cbp) information corresponding to the 2N×2N block, wherein N is a positive integer greater than four; and
   utilizing a coding unit for generating a codeword with only the macroblock type information and the cbp information coded therein.

2. The method of claim 1, wherein generating the codeword comprises:

generating the codeword by performing variable length coding upon only the macroblock type information and the cbp information.

3. A method for processing a 2N×2N block under intra-prediction mode, comprising:
   utilizing a checking unit for checking if a coded block pattern (cbp) corresponding to the 2N×2N block is equal to zero, wherein N is a positive integer greater than four; and
   when the cbp is equal to zero, not transmitting information of a delta quantization parameter (delta QP).

4. A method for processing a block under intra-prediction, comprising:
   checking if the block is a 2N×2N block, wherein N is a positive integer greater than four; and
   when the block is the 2N×2N block, utilizing a de-blocking filtering unit for performing a de-blocking filtering operation only upon 2N×2N block edges of the 2N×2N block.

5. A processing circuit for processing a 2N×2N block under intra-prediction, comprising:
   a macroblock type determining unit, for determining macroblock type information corresponding to the 2N×2N block, wherein N is a positive integer greater than four;
   a coded block pattern (cbp) determining unit, for determining cbp information corresponding to the 2N×2N block; and
   a coding unit, coupled to the macroblock type determining unit and the cbp determining unit, for generating a codeword with only the macroblock type information and the cbp information coded therein.

6. The processing circuit of claim 5, wherein the coding unit generates the codeword by performing variable length coding upon only the macroblock type information and the cbp information.

7. A processing circuit for processing a 2N×2N block under intra-prediction, comprising:
   a checking unit, for checking if a coded block pattern (cbp) corresponding to the 2N×2N block is equal to zero, wherein N is a positive integer greater than four; and
   a control unit, coupled to the checking unit, wherein the control unit does not transmit information of a delta quantization parameter (delta QP) when the cbp is equal to zero.

8. A processing circuit for processing a block under intra-prediction, comprising:
   a checking unit, for checking if the block is a 2N×2N block, wherein N is a positive integer greater than four; and
   a de-blocking filtering unit, coupled to the checking unit, wherein when the block is the 2N×2N block, the de-blocking filtering unit performs a de-blocking filtering operation only upon 2N×2N block edges of the 2N×2N block.

* * * * *